(12) United States Patent  
Crean (10) Patent No.: US 7,240,945 B1
(45) Date of Patent: Jul. 10, 2007

(54) ARTICULATING OVERHEAD CONSOLE FOR RECREATIONAL VEHICLES

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 63 days.

(21) Appl. No.: 11/033,456

(22) Filed: Jan. 10, 2005

Related U.S. Application Data

(60) Provisional application No. 60/535,440, filed on Jan. 9, 2004.

(51) Int. Cl.
*B60R 5/02* (2006.01)
(52) U.S. Cl. .................................................. 296/37.7
(58) Field of Classification Search ............... 296/37.7, 296/156, 24.3, 24.34, 37.1, 37.8, 1.07, 24.33, 296/24.4
See application file for complete search history.

(56) References Cited

U.S. PATENT DOCUMENTS

| | | | | |
|---|---|---|---|---|
| 4,179,153 A | * | 12/1979 | Cole, Jr. ..................... | 296/37.1 |
| 4,266,821 A | * | 5/1981 | Gillet ......................... | 296/37.6 |
| 4,275,913 A | * | 6/1981 | Marcus ....................... | 296/37.1 |
| 4,368,937 A | * | 1/1983 | Palombo et al. ............. | 312/325 |
| 4,469,365 A | * | 9/1984 | Marcus et al. ............. | 296/37.7 |
| 7,055,883 B2 | * | 6/2006 | Tokutomi et al. .......... | 296/37.8 |
| 2006/0097537 A1 | * | 5/2006 | Schedivy .................... | 296/37.8 |
| 2006/0113810 A1 | * | 6/2006 | Kuhl et al. .............. | 296/24.34 |

* cited by examiner

*Primary Examiner*—H Gutman
(74) *Attorney, Agent, or Firm*—Knobbe, Martens, Olson & Bear, LLP (57) ABSTRACT

The present teachings disclose a recreational vehicle comprising, in one embodiment, a chassis having a plurality of wheels and a vehicle frame having a front frame member mounted to the chassis. In addition, the recreational vehicle includes a coach having a plurality of walls that are joined together so as to define an interior living space with a floor and a roof, wherein the plurality of walls includes a front wall positioned adjacent the front frame member, and wherein the interior living space includes a first living area defined adjacent the front wall. Also, the recreational vehicle includes an overhead console that is positioned adjacent the front wall and the coach roof so as to be accessible from the front portion of the interior living space. Moreover, the overhead console is pivotally attached to the front frame member, wherein the overhead console articulates from a first position relative to the front wall of the coach to a second position that is a first distance away from the front wall. Advantageously, the articulation of the overhead console away from the front wall of the coach allows a user access to the rear of the of the overhead console.

30 Claims, 11 Drawing Sheets

ARTICULATING OVERHEAD CONSOLE FOR RECREATIONAL VEHICLES

PRIORITY APPLICATIONS

This application claims priority benefit of U.S. Provisional Patent Application No. 60/535,440 filed Jan. 9, 2004, titled "ARTICULATING OVERHEAD CONSOLE FOR RECREATIONAL VEHICLES," which is incorporated herein by reference in its entirety.

BACKGROUND

1. Field

The present teachings relate to recreational vehicles and, in particular, to an articulating overhead console for recreational vehicles.

2. Description of the Related Art

Recreational vehicles are becoming increasingly popular with people who wish to retain the comforts and conveniences of home while spending extended periods of time away from home at remote locations. In more elaborate configurations, a recreational vehicle can include amenities such as a bedroom, a bathroom with a sink and a flushing toilet, a kitchen with a refrigerator, stove, and sink, and a generously sized living area with reclining chairs and an entertainment center. Additionally, a recreational vehicle may be easily parked at a wide variety of locations so that users may enjoy the amenities of the vehicle at their favorite destination. Consequently, people who use recreational vehicles may be assured of a comfortable living environment at their preferred remote destination without having to rely on the availability of suitable hotels.

In response to consumer demand, manufacturers have developed increasingly larger recreational vehicles to accommodate the conveniences of home. In particular, manufacturers have developed recreational vehicles with relatively large overhead entertainment centers or consoles that house various media components, such as televisions, stereo equipment, and various other audio and video components. Typically, in motorhomes, these overhead consoles are mounted above the front windshield. Positioning entertainment devices in this location is convenient as it is generally visible from other locations within the coach and is also placed in a location that is typically not used for storage. However, the space above the front windshield of a motorhome can be rather limited and with increased amounts of entertainment gear positioned in the console, crowding of components can be a problem.

In general, the various media components are electrically coupled together via connection cables or wires so as to communicate with each other. For example, a video component, such as a digital video disk (DVD) player is typically coupled to a television so that video signals produced by the DVD player can be displayed on the television in a viewable manner. Similarly, television monitors can also be linked to game devices, stereo systems, internet connections, satellite or cable outlets, and the like, each requiring some form of connection cables. Unfortunately, these connection wires are not easily accessible due to their position behind the media components and the overhead console.

In many instances, since the recreational vehicle is movable, the media components are securely mounted within overhead console so that the media components do not fall out of the overhead console when the recreational vehicle is in motion. Therefore, as a result, it can be highly difficult for a user to access the connection wires if a problem with the media components occurs or if there is a desire to change or upgrade one or more components. Typically, a user has to completely remove one or more of the media components from the overhead console before access to the connection wires can be achieved.

Unfortunately, removal of the mounted media components can be inconvenient and dangerous in some circumstances. For example, a relatively large television can weigh over 100 pounds and, therefore, must be dismounted from the overhead console by more than one person. In addition, when disconnecting wires from the media components, one has to be careful not to disconnect other wires attached to other media components. This can, unfortunately, create even more problems that subsequently have to be fixed. Further, since the overhead consoles are typically placed above the windshield, these components are often located above the individual's head which complicates access to the console components. Moreover, accessing the back of the components to change the interconnections is further complicated by the presence of seats and other obstructions that inhibit easy access to the components.

Thus, there currently exists a need to improve the structure of conventional overhead consoles for recreational vehicles. In addition, there also exists need to improve the manner in which media components, including the connection wires that electrically couple the media components together, are accessed from the overhead console.

SUMMARY

The aforementioned needs may be satisfied by a recreational vehicle comprising, in one embodiment, a chassis having a plurality of wheels and a vehicle frame having a front frame member mounted to the chassis. In addition, the recreational vehicle includes a coach having a plurality of walls that are joined together so as to define an interior living space with a floor and a roof, wherein the plurality of walls includes a front wall positioned adjacent the front frame member, and wherein the interior living space includes a first living area defined adjacent the front wall. Moreover, the recreational vehicle further includes an overhead console pivotally attached to the front frame member, wherein the overhead console articulates from a first position relative to the front wall of the coach to a second position that is a first distance away from the front wall.

In one aspect, the front frame member is mounted to a front end of the vehicle frame so as to extend therefrom in a substantially perpendicular manner. The overhead console is positioned adjacent the front wall and the coach roof so as to be accessible from the front portion of the interior living space. The articulation of the overhead console allows a user access to the rear of the of the overhead console.

In another aspect, the overhead console includes a plurality of structural members that are joined together so as to define a media enclosure having a main enclosure that houses at leas tone first media component and a plurality of side enclosures that houses at least one second media component. The overhead console is adaptively sized so as to house the first and second media components. The first and second media components are electrically connected via connection wires that are positioned behind the overhead console. The articulation of the overhead console allows a user access to the rear of the first and second media components including the connection wires that are positioned behind the overhead console. The at least one first media component is selected form the group consisting of a viewing monitor and a television, and wherein the at least one second media component is selected form the group consisting of a personal computer (PC), a digital satellite system (DSS) receiver, a digital video disk (DVD) player, a video cassette recorder (VCR) including a video cassette player, a compact disk (CD) player, a stereo receiver, an audio power amplifier, and an audio/video (AV) distribution device.

In still another aspect, the overhead console includes a console frame member and a console shell member that is attached to a front portion of the console frame member. The console frame member of the overhead console is releasably fastened to the front frame member of the vehicle frame via a release assembly. The release assembly includes at least one bracket having a first member attached to a second member in a substantially perpendicular manner so as to define an L-shaped structure. The first member is securely attached to the front frame member via a fastening means that includes a weld. The second member includes a slotted region that is adapted to receive a shaft component, and wherein the shaft component is adapted to communicate with the slotted region of the bracket and with at least one mounting aperture formed in the console frame member, and wherein the shaft component includes a threaded surface that is adapted to receive at least one fastener component so as to releasably fasten the console frame member to the front frame member.

Additionally, a first end of the shaft component communicates with the slotted region of the at least one bracket and is releasably attached to the at least one bracket via a first fastener, and wherein the first fastener is readily detachable from the shaft component so that the console frame member of the overhead console can be detached from the front frame member, and wherein detaching the first fastener releases the console frame member from the front frame member and allows the overhead console including the console frame member to freely pivot or rotate away from the front frame member. The shaft member includes a bolt that is adapted to receive the first fastener, and wherein the first fastener includes a nut that is adapted to communicate with the shaft member so as to be releasably fastened thereto.

Moreover, the console shell member includes a contoured shape that is similar in appearance to the interior living space, and wherein the contoured shape of the console shell member is adapted to cover the console frame member. The console shell member includes a rigid material including plastic. The console shell member includes one or more openings formed therein that allow access to the interior of the overhead console. The console frame member includes a rigid material including a metal or metal alloy material selected from the group consisting of steel and aluminum.

In one embodiment, the recreational vehicle further includes a side frame member mounted to the chassis, and a side wall mounted to the side frame member. The recreational vehicle further includes a side overhead console pivotally attached to the side frame member. The side overhead console articulates from a first position relative to the side wall to a second position that is a first distance away from the side wall.

In one embodiment, the recreational vehicle further includes a rear frame member mounted to the chassis, and a rear wall mounted to the rear frame member. The recreational vehicle further includes a rear overhead console pivotally attached to the rear frame member. The rear overhead console articulates from a first position relative to the rear wall to a second position that is a first distance away from the rear wall.

Another aspect of the present teachings relates to a recreational vehicle that includes a chassis having a plurality of wheels. The recreational vehicle further includes a vehicle frame mounted to the chassis. The recreational vehicle further includes a coach supported at least in part by the vehicle frame. The coach includes a plurality of walls that are joined together so as to define an interior living space with a floor and a roof. The recreational vehicle further includes an overhead console pivotally coupled to a portion of the vehicle frame. The overhead console is configured to retain and present one or more media component to an occupant in the interior living space when in a first orientation. The overhead console articulates from the first orientation a second orientation that provides an easier access to rear portions of the one or more media components.

In one embodiment, the first orientation provides easy viewing and controlling of the one or more media components. The second orientation provides easy servicing of the rear portions of the one or more media components. The easy servicing is allowed by providing an increased amount of separation between the rear portions of the one or more media components in the overhead console and a wall adjacent the overhead console.

In one embodiment, the plurality of walls includes a front wall, and the overhead console is coupled to a front frame member. In one embodiment, the plurality of walls includes a rear wall, and the overhead console is coupled to a rear frame member. In one embodiment, the plurality of walls includes a side wall, and the overhead console is coupled to a side frame member. In one embodiment of such a side-mounted configuration, the interior living space includes a living room having a couch that faces a first side wall, and the overhead console is coupled to the side frame member corresponding to a second side wall that is opposite from the first side wall, thereby allowing the overhead console to be enjoyed from the couch.

These and other objects and advantages of the present invention will become more fully apparent from the following description taken in conjunction with the accompanying drawings.

DETAILED DESCRIPTION OF SOME EMBODIMENTS

Reference will now be made to the drawings wherein like numerals refer to like parts throughout. FIGS. 1A–3D show one embodiment of an articulating overhead console for recreational vehicles that is adapted to pivot so as to provide ready access to media and utility components positioned therein. This unique structure and various other aspects of the present teachings will be described in greater detail herein below with reference to the drawings.

Figure 1A:
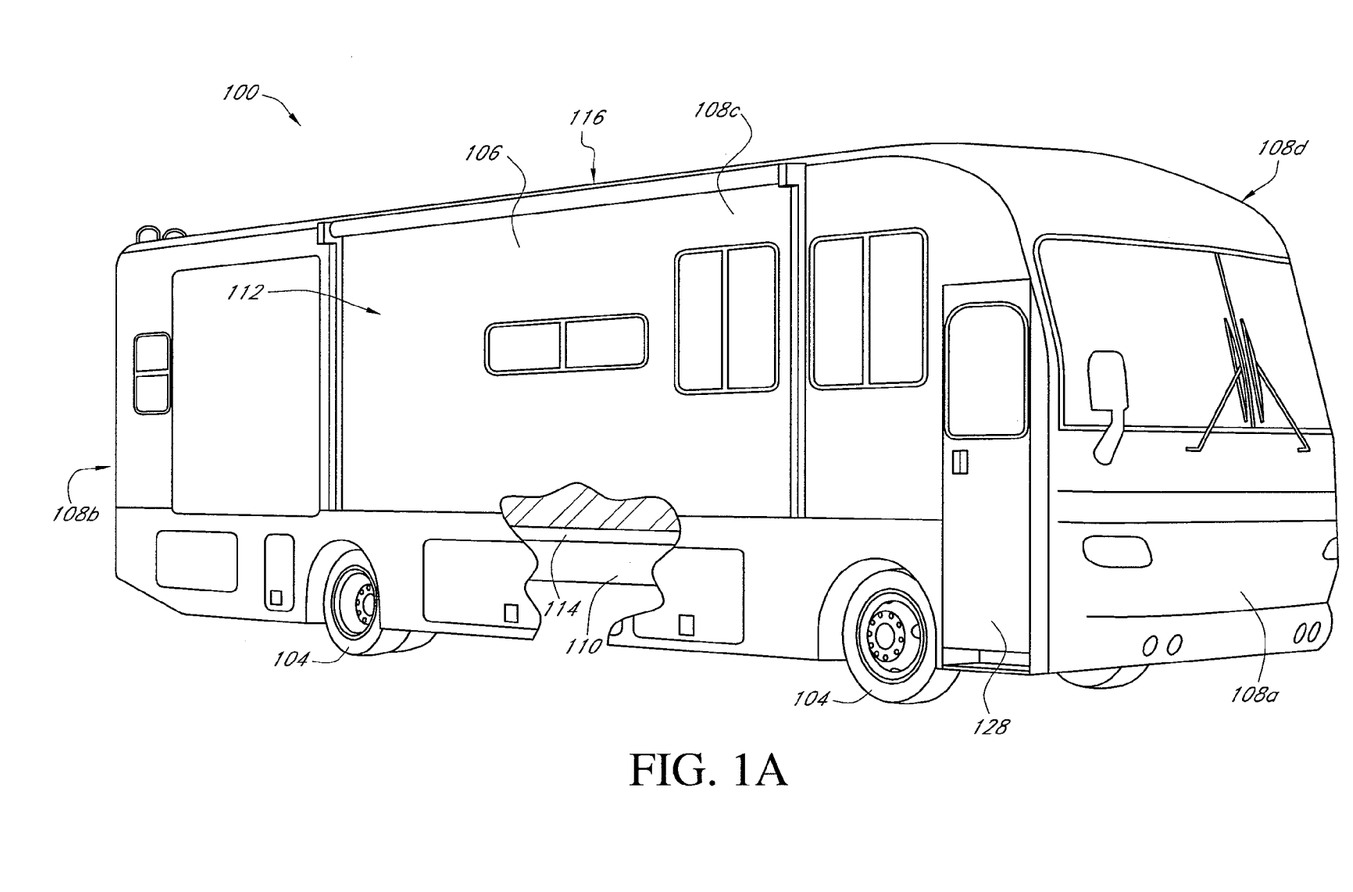
FIG. 1A shows one embodiment of a recreational vehicle.

FIG. 1A shows one embodiment of a recreational vehicle (RV) 100 having a generally rectangular chassis 102 (shown in FIG. 2A) attached to a plurality of wheels 104 so as to permit rolling movement of the RV 100 over the ground. The RV 100 further includes a coach or main housing 106 that is essentially formed of a plurality of exterior sidewalls 108a, 108b, 108c, 108d that are joined together and mounted to a vehicle frame 110 (also shown in FIG. 2A) in a generally known manner so as to define an interior living space 112 (shown in FIG. 1B) having a coach floor 114 and coach roof 116. A generally horizontal axis generally parallel to the coach floor 114, extends from a front sidewall 108a of the coach 106 to a rear sidewall 108b of the coach 106. The RV 100 further includes a first sidewall 108c and a second sidewall 108d that is positioned opposite the first sidewall 108c. In one embodiment, as will be described in greater detail herein below, an overhead articulating console of the present teachings may be positioned, at least in part, adjacent to the front sidewall 108a and the coach roof 116 so as to be accessible from the interior living space 112 of the coach 106.

As further shown in FIG. 1A, the RV 100 may include, for example in one embodiment, a motorhome. However, it should be appreciated that the RV 100 described herein represents any movable coach on wheels, such as, but not limited to, the shown motorhome, a fifth wheel trailer, a conventional trailer, a tent trailer, or even a cab-over camper for use with a pick-up truck. Additionally, the RV 100, such as the motorhome shown in FIG. 1A, permits occupants to travel and live in the RV 100 in a comfortable manner. One aspect of comfort pertains to having sufficient living space within the RV 100 such that the interior living space 112 may be partitioned with interior walls and passageways (shown in FIG. 1B) in a generally known manner so as to define interior rooms and various other interior living spaces, such as a living room, kitchen, bedroom, bathroom, etc., which generally enhance the comfort of the RV 100.

Additionally, the RV 100 may further include an engine, transmission, drive axle, fuel system, and electrical system of types generally known in the art to provide the motive power for the RV 100. The chassis 102 also facilitates mounting of relatively massive items, such as generators, air conditioners, and the like to the vehicle frame 102. As will be described in greater detail herein below with reference to FIG. 2A, the vehicle frame 110 may further include sub-floor structural components, such as cross-supports and other various supporting members to provide strength and structural reinforcement to the exterior sidewalls 108a, 108b, 108c, 108d, coach floor 114, etc.

Figure 1B:
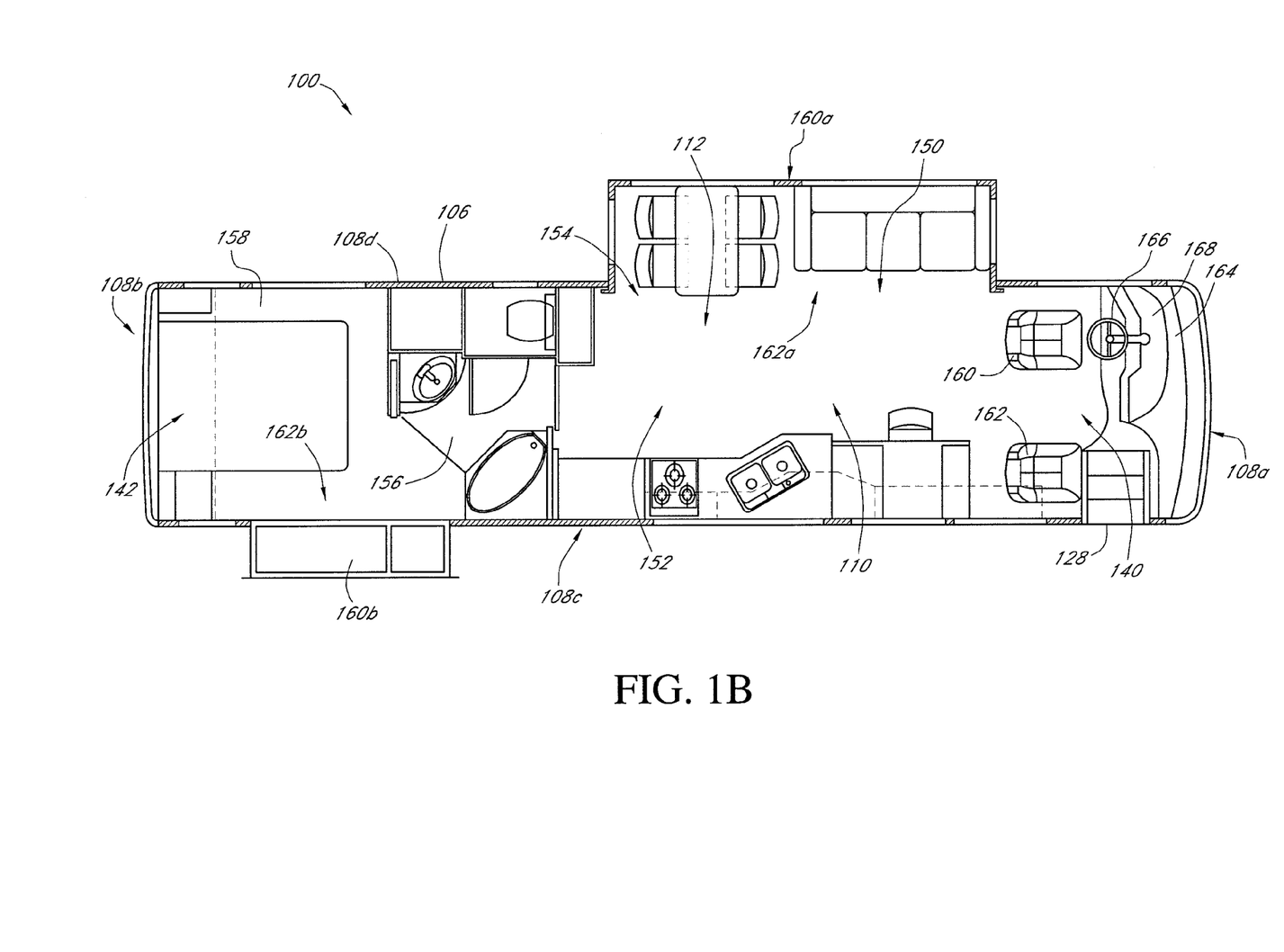
FIG. 1B shows one embodiment of a detailed plan view of an interior living space.

FIG. 1B shows one embodiment of a detailed plan view of the interior living space 112 within the coach 106 of the RV 100. As shown in FIG. 1B, the interior living space 112 of the coach 106 may be arranged in a manner so as to provide comfort and functionality to one or more users. As further shown in FIG. 1B, the interior living space 112 of the RV 100 may be sub-divided or partitioned into separate living spaces or sections, including a living room area 150, a kitchen area 152, a dining area 154, a bathroom area 156, and a bedroom area 158. Additionally, the RV 100 further includes an entry door 128 formed in at least one of the exterior sidewalls of the coach 106, such as the first sidewall 108c, which provides an RV user with a first point of entry into the coach 106.

In one embodiment, the coach 106 of the RV 100 may be equipped with an expandable slide-out housing 160a. The example slide-out 160a is shown to be positioned within an opening 162a formed in the second sidewall 108d of the coach 106. The slide-out 160a may be used to increase the interior living space 112 of the RV 100. In addition, the RV 100 may further include another example slide-out housing 160b positioned within an opening 162b formed in the first sidewall 108c of the coach 106 so as to further increase the interior living space 112 of the RV 100. Therefore, it should be appreciated by those skilled in the art that the RV 100 may include one or more expandable slide-out housings positioned in one or more exterior sidewalls without departing from the scope of the present teachings.

In one embodiment, a front portion 140 of the coach 106 may serve as a riding and/or driving area for the driver and passengers when the RV 100 is in a travelling motion. In one embodiment, the front portion 140 of the coach 106 includes a driver's seat 160, a passenger seat 162, and a driver's console 164 having a steering wheel 166 and a gauge section 168. Also, a rear portion 142 of the coach 106 is positioned opposite the front portion 140 of the coach 106. As will be described in greater detail herein below, an overhead articulating console of the present teachings may be positioned, at least in part, adjacent to the front sidewall 108a so as to be accessible from the front portion 140 of the coach 106. Moreover, it should be appreciated by those skilled in the art that the layout of the interior living space 112 as shown and described herein is simply one embodiment of the present teachings and that a number of generally known variations to this interior and exterior layout may be made by those skilled in the art without departing from the scope of the present teachings.

Figure 1C:
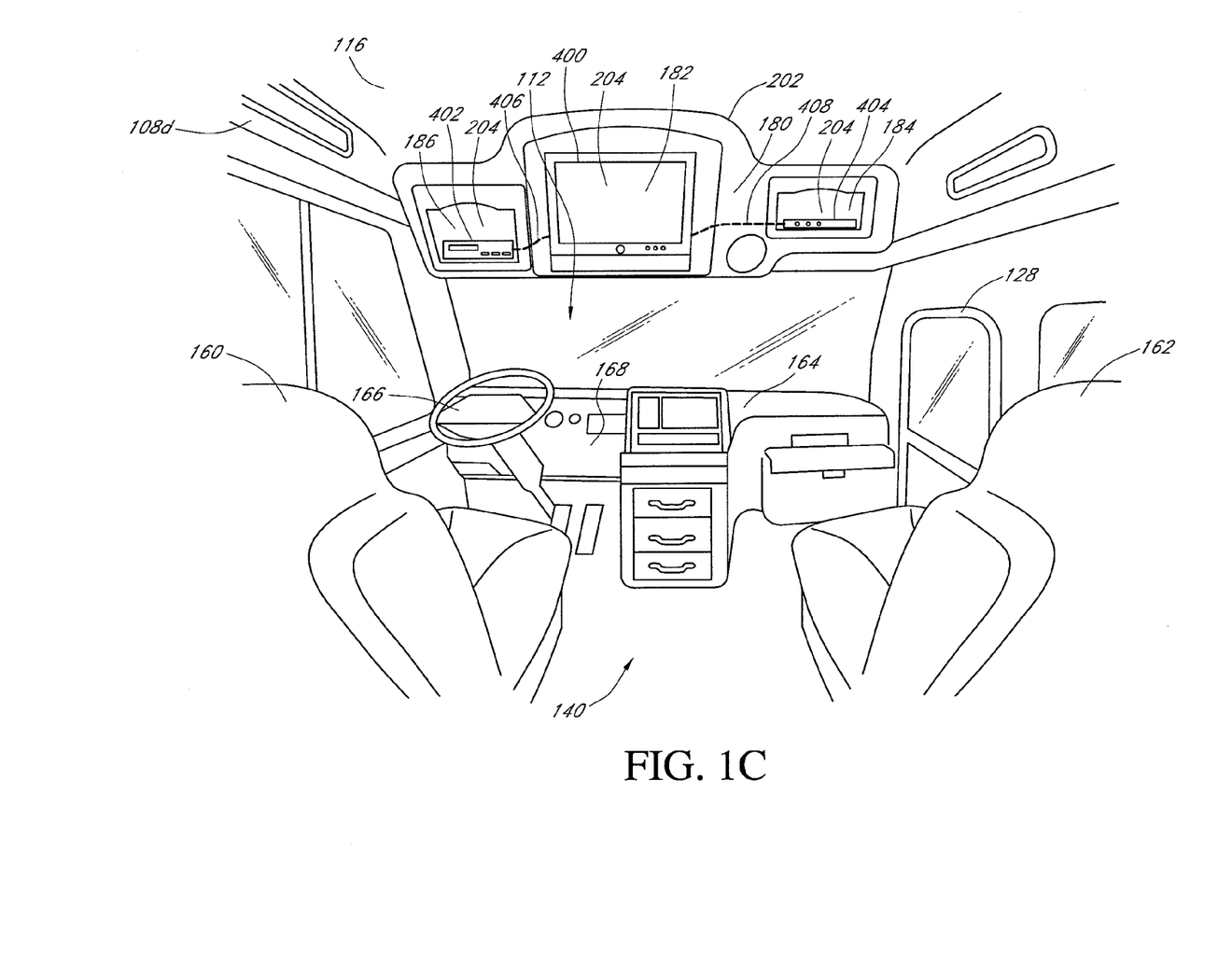
FIG. 1C shows one embodiment of an articulating overhead console.

FIG. 1C shows one embodiment of an overhead console 180 positioned adjacent the front sidewall 108a and the coach roof 116 so as to be accessible from the interior living space 112 of the coach 106. In one embodiment, the overhead console 180 includes a media or entertainment enclosure having a main enclosure 182 that houses a media component 400 such as a viewing monitor, such as a television or computer display monitor, and a plurality of side enclosures 184, 186 that houses one or more media components 402, 404, such as a personal computer (PC), digital satellite system (DSS) receiver, digital video disk (DVD) player, video cassette recorder (VCR) and player, compact disk (CD) player, a stereo receiver, audio power amplifiers, audio/video (AV) distribution devices, etc. It should be appreciated that the dimensions of the enclosures 182, 184, 186 may vary in size depending on the dimensions of the one or more media components. Therefore, the dimensions of the overhead console 180 may be adaptively sized to house and/or enclose the various media components depending on the application or implementation without departing from the scope of the present teachings. Furthermore, arrangements of the enclosures 182, 184, 186 may be varied to suit various designs and/or needs. Moreover, it will be understood that the enclosures 182, 184, 186 are shown and described as an example. More or less enclosures (than the example three enclosures) may be implemented without departing from the scope of the present teachings.

In one embodiment, as further shown in FIG. 1C, the media components are mounted in the overhead console 180 so as to be viewable and accessible from the front portion 140 of the coach 106. Also, the media components housed in the overhead console 180 are electrically interconnected via generally known electrical conduits, such as audio and video cables and/or wires. As will be described in greater detail herein below, the overhead console 180 is adapted to be able to transition between a first position relative to the front sidewall 108a of the coach 106 and a second position that is a first distance away from the front sidewall 108a of the coach 106. Advantageously, this allows a user ready access to the rear of the overhead console 180 and the media components including the connection wires (depicted as dashed lines 406 and 408) that are positioned behind the overhead console 180.

Additionally, in one embodiment, the overhead console 180 further includes a console frame member 200 (shown in FIGS. 2A–3D) and a console shell member 202 that is attached to the front portion of the console frame member 200. One possible function of the console shell member 202 is to cover the console frame member 200 in a manner so as to blend in with the surrounding interior components. Also, the console shell member 202 includes a contoured shape that is similar in appearance to the interior living space 112. In one embodiment, the console shell member 202 can be fabricated from a rigid material, including but not limited to, plastic, wood, or any other material suitable for enhancing the interior. It will be understood that the console shell member 202 can be fabricated from any number of materials. Moreover, the console shell member 202 includes one or more openings 204 formed therein that allow access to the various media components positioned within the overhead console 180. It should be appreciated by those skilled in the art that the dimensions of the one or more openings 204 formed in the console shell member 202 may be adaptively sized to allow a user access to the front portion of the various media components positioned in the overhead console 180 without departing from the scope of the present teachings. Also, the arrangement and/or number of the one or more openings 204 may be varied to accommodate various designs.

Figure 2A:
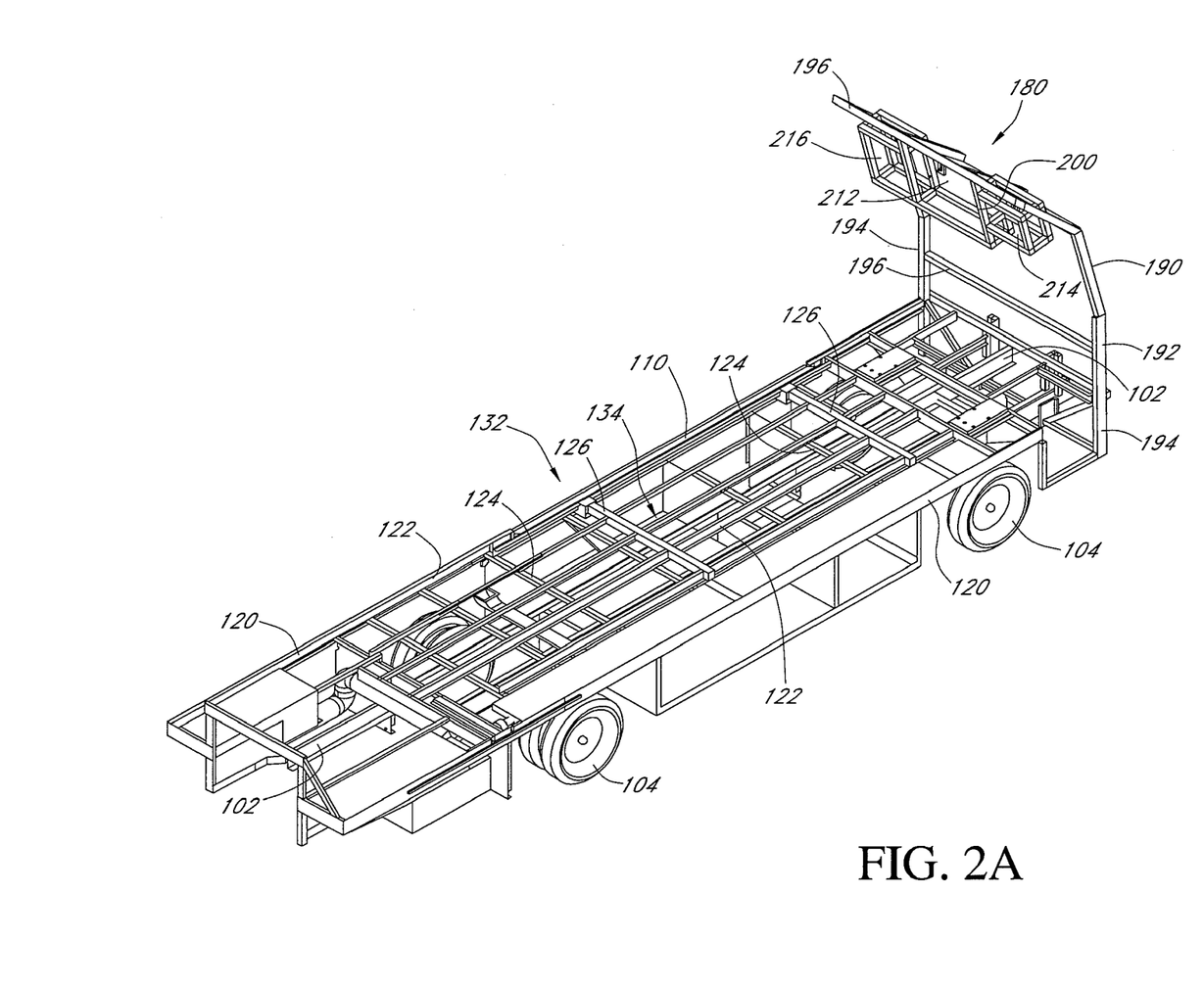
FIG. 2A shows one embodiment of a chassis and a vehicle frame.

FIG. 2A shows one embodiment of the chassis 102 and vehicle frame 110 of the RV 100. As shown in FIG. 2A, the vehicle frame 110 is mounted on the chassis 102. The chassis 102 may include a generally known split rail or raised rail chassis. For example, the chassis 102 may include a diesel pusher type that is commercially available from Freightliner of Portland, Oreg. It will be understood that any number of other chassis types and/or power-plant types may be used for implementing the concepts of the present teachings. As further shown in FIG. 2A, the vehicle frame 110 may be formed of a plurality of structural support members 120 comprising a rigid material, such as various metals or metal alloys including steel and aluminum, that can be arranged and joined together via a fastening means, such as welding, so as to define a floor section 132.

In one embodiment, the structural members 120 may include elongate support members 122 that extend along the length of the RV 100 and substantially parallel to the chassis 102. Also, the structural members 120 may further include cross-support members 124 that extend between and substantially perpendicular to the elongate support members 122. The structural members 120 may be distally spaced apart so as to define cavity regions 134 between structural members 120. In addition, the structural support members 110 may further include one or more armature members 126 that function to retract and deploy the slide-out assembly 160 (shown in FIG. 1B) in a generally known manner.

Additionally, as further shown in FIG. 2A, the vehicle frame 110 of the RV 100 further includes a front frame member 190 securely mounted thereto. In one embodiment, the front frame member 190 includes a generally rectangular structure that provides structural support for the front portion of the coach 106 including the sidewalls 108a, 108c, 108d and the coach roof 116. Also, the front frame member 190 is assembled from a plurality of elongate structural members 192 comprising a rigid material, such as various metals or metal alloys including steel and aluminum, that can be joined together in a known manner—e.g., welding, etc. The structural members 192 include a first plurality of structural members 194 that extend in a substantially vertical direction from at least a portion of the vehicle frame 110 and a second plurality of structural members 196 that extend in a substantially horizontal direction interposed between the first plurality of structural members 194.

Moreover, as further shown in FIG. 2A, one embodiment of the console frame member 200 of the overhead console 180 is pivotally attached to the front frame member 190 in a manner that will be described in greater detail herein below. The console frame member 200 includes a main frame section 212 that corresponds to the main enclosure 182 that houses a viewing monitor, such as a television or computer display monitor, and a plurality of side frame sections 214, 216 that correspond to the plurality of side enclosures 184, 186 that house various other media components, such as a DSS receiver, DVD player, VCR, a stereo receiver, etc. In one aspect, it should be appreciated that the dimensions of the frame sections 212, 214, 216 may vary in size depending on the dimensions of the one or more media components housed therein. Therefore, the dimensions of the overhead console 180 including the console frame member 200 may be adaptively sized to house and/or enclose the various media components depending on the application or implementation without departing from the scope of the present teachings.

Figure 2B:
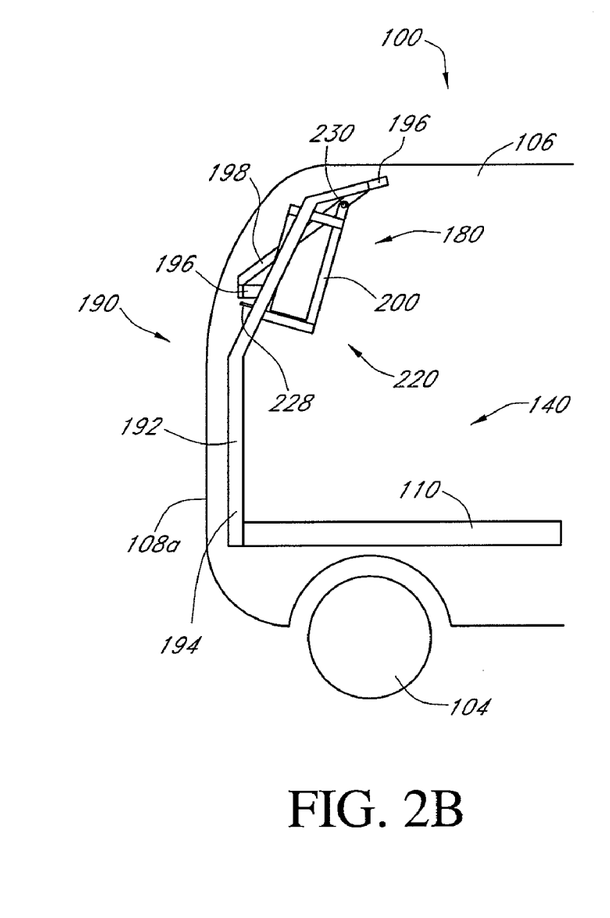
FIGS. 2B, 2C show one embodiment of a pivotal motion of a console frame member of the overhead console with respect to a front frame member of the vehicle frame.
Figure 2C:
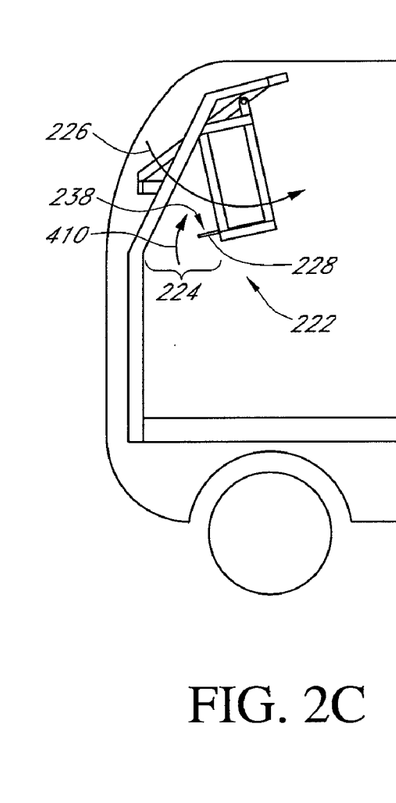

FIGS. 2B, 2C show a side view of the pivotal motion of the console frame member 200 of the overhead console 180 with respect to the front frame member 190 of the vehicle frame 110. In one aspect, FIG. 2B shows the console frame member 200 in a first position 220 relative to the front frame member 190, and FIG. 2C shows the console frame member 200 in a second position 222 that is a first distance 224 away from the front frame member 190. Advantageously, the movement of the console frame member 200 allows a user access (depicted as arrow 410) to the rear of the overhead console 180 and media components housed therein including connection wires that are positioned behind the overhead console 180. It should be appreciated by those skilled in the art that the first distance 224 of articulation may vary in length depending on the particular application or implementation without departing from the scope of the present teachings.

As shown in FIGS. 2B, 2C, the front frame member 190 further includes one or more cross-support members 198 preferably formed from a rigid material, such as various metals or metal alloys including steel and aluminum, that are securely fastened to the first and second plurality of structural members 194, 196. In one embodiment, the structural members 194, 196, 198 are arranged and joined together so as to at least partially contour the shape of the front sidewall 108a of the coach 106. In addition, the overhead console 180 can be pivotally attached to the one or more cross-support members 198 via a pivot assembly 230, such as a bolt, nut, and washer configuration. Moreover, as shown in FIGS. 2B, 2C, the console frame member 200 of the overhead console 180 pivots in a first direction 226 about the pivot assembly 230 so as to be displaced the first distance 224 from the front frame member 190. Further scope and functionality of the pivot assembly 230 will be described in greater detail herein below.

Additionally, as further shown in FIGS. 2B–3A, the overhead console 180 further includes a platform member 228 that is attached to a portion of the console frame member 200 so as to provide a substantially flat supporting surface 238 for a relatively large media component, such as a television. In one embodiment, the platform member 228 includes a rigid material, such as sheet metal, wood, etc., having a thickness large enough to support the relatively large media component. It should be appreciated that the dimensions and shape of the platform member 228 may be adaptively sized and/or contoured to the dimensions and shape of the various media components positioned thereon depending on the application or implementation without departing from the scope of the present teachings.

Figure 3A:
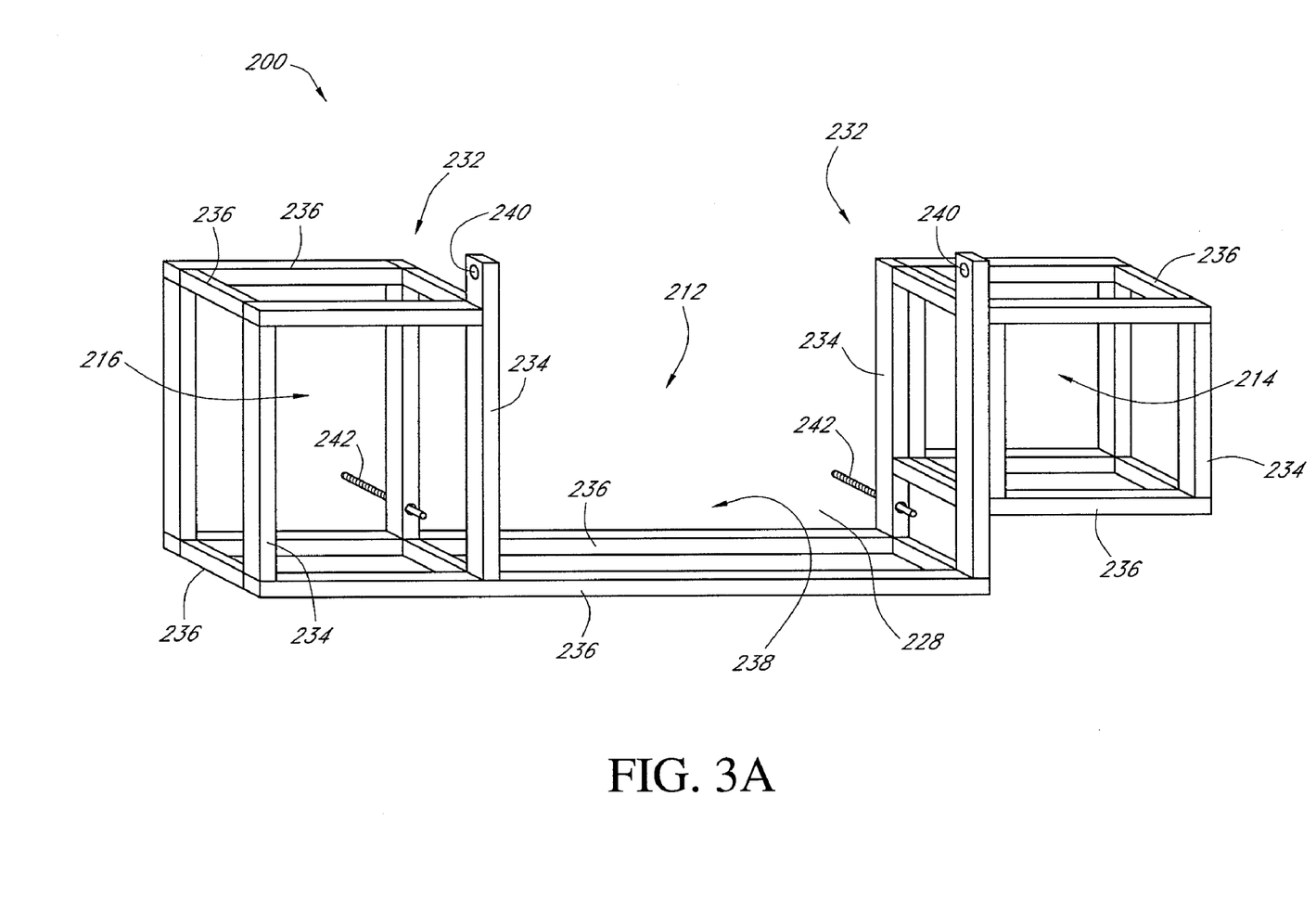
FIG. 3A shows a perspective view of one embodiment of the console frame member of the overhead console.

FIG. 3A shows a perspective view of one embodiment of the console frame member 200 of the overhead console 180. As shown in FIG. 3A, the console frame member 200 is assembled from a plurality of elongate structural members 232 comprising a rigid material, such as various metals or metal alloys including steel and aluminum, that are arranged and joined together via a fastening means, such as welding. In one embodiment, the structural members 232 include a first plurality of structural members 234 that extend in a generally vertical direction and a second plurality of structural members 236 that extend in a generally horizontal direction interposed between the first plurality of structural members 234. In addition, the structural members 232 are further arranged and joined together so as to define the main frame section 212 and first and second side frame sections 214, 216. As shown in FIG. 3A, the first and second side sections 214, 216 are attached to the main frame section 212 via a fastening means, such as weld, so as to be interposed therebetween. The console frame member 200 is adapted to structurally support the media enclosure, which includes the main enclosure 182 that houses a viewing monitor, such as a television, and the first and second side enclosures 184, 186 that houses one or more media components, such as a PC, DSS receiver, DVD player, VCR, stereo receiver, etc.

Additionally, in one embodiment, the console frame member 200 further includes one or more mounting apertures 240 that are formed in one or more of the structural members 232 adjacent the upper portion of the console frame member 200. Moreover, the mounting apertures 240 are adapted to receive a portion of the one or more pivot assemblies 230 so that the console frame member 200 can be pivotally attached to one or more of the structural members 192 of the front frame member 190.

Furthermore, in one embodiment, the console frame member 200 further includes one or more mounting posts 242 that are attached to one or more of the structural members 232 of the console frame member 200. In one embodiment, the purpose of the mounting posts 242 is to securely fasten the console frame member 200 to the front frame member 190 in the first position 220 as shown in FIG. 2B. Further scope and functionality related to the mounting posts 242 will be described in greater detail herein below.

Figure 3B:
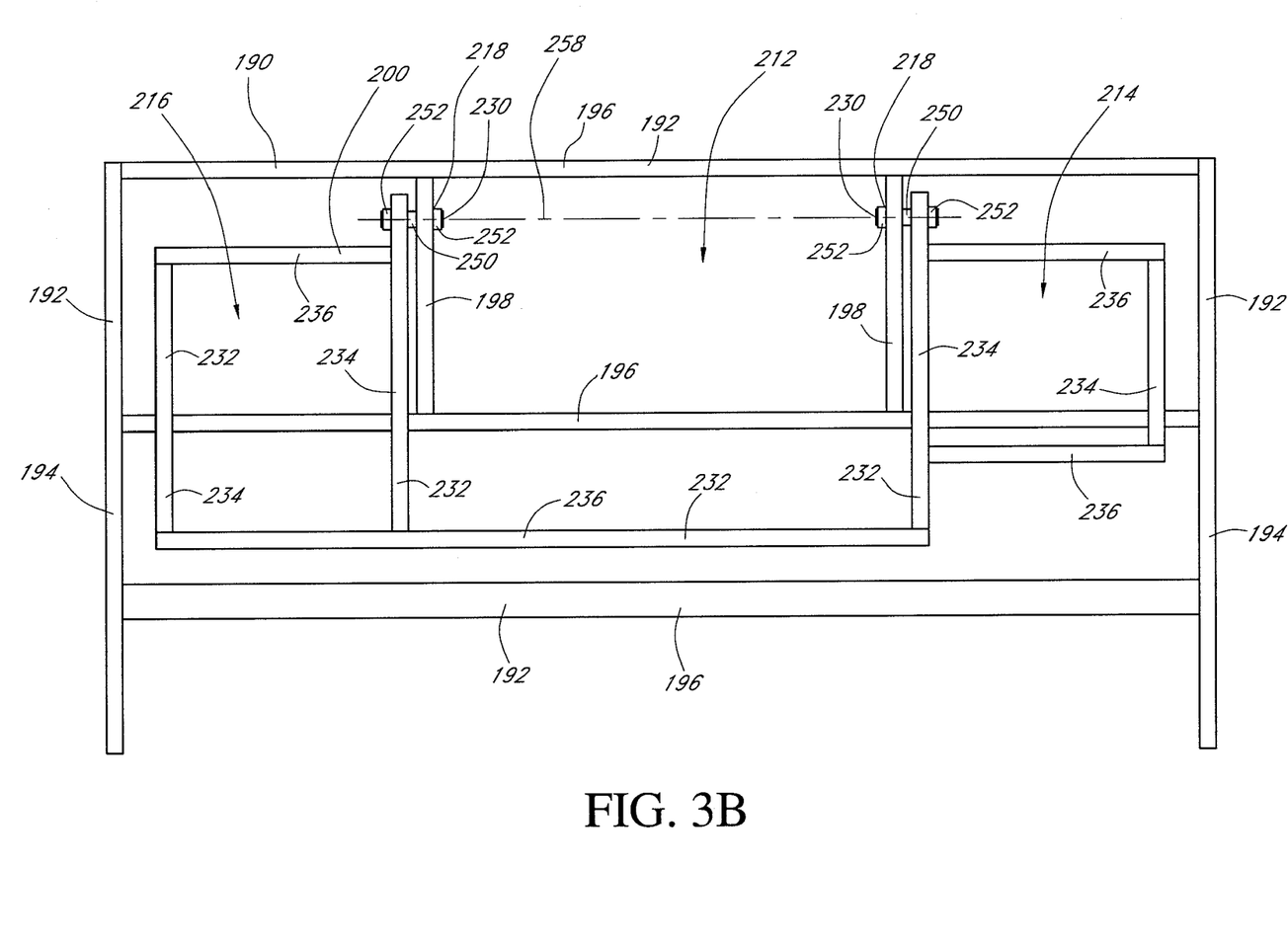
FIG. 3B shows a front view of the console frame member attached to the front frame member via one or more pivot assemblies.

FIG. 3B shows a front view of the console frame member 200 attached to the front frame member 190 via one or more pivot assemblies 230. In one embodiment, the one or more pivot assemblies 230 include a shaft component 250, such as a bolt, and one or more fastener components 252, such as nuts. In addition, the shaft component 250 is adapted to communicate with the mounting apertures 240 formed in the structural members 232 of the console frame member 200 and also with one or more mounting apertures 218 formed in the structural members 192 of the front frame member 190. Moreover, the shaft component 250 includes a threaded surface at either end thereof that is adapted to receive one or more of the fastener components 234 so as to securely fasten the console frame member 200 to the front frame member 190.

Advantageously, the pivot assembly 230 securely fastens the console frame member 200 to the front frame member 190 such that the console frame member 200 can pivot or rotate with respect to the front frame member 190. In one aspect, the shaft component 250 of the pivot assembly 230 further defines a pivot axis 258 such that the console frame member 200 pivots or rotates about the pivot axis 258 with respect to the front frame member 190. It should be appreciated by those skilled in the art that the pivot assembly 230 may include various other components, such as washers, bearings, lubrication, etc., without departing from the scope of the present teachings. It should also be appreciated by those skilled in the art that the orientation or positioning of the structural members 232 of the console frame member 200 with respect to the structural members 192 of the front frame member 190 may be altered without departing from the scope of the present teachings.

It will be understood that the pivot assembly 230 is one example of a hinging device that hingeably attaches the console frame member to the front frame member. A number of other hinging devices such as a substantially continuous hinge, an assembly of interconnecting extrusions, and the like, can provide a similar functionality.

Figure 3C:
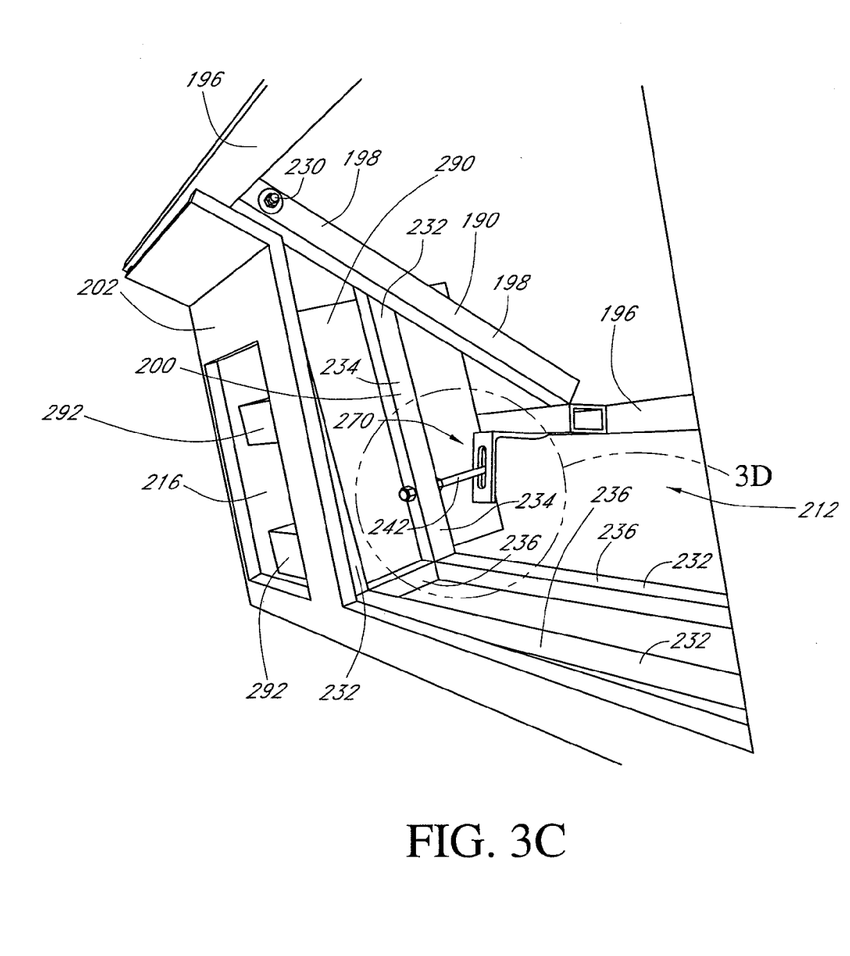
FIG. 3C shows a partial perspective view of the overhead console including the console frame member in a first position.

FIG. 3C shows a partial perspective view of the overhead console 180 including the console frame member 200 in the first position 220 as shown in FIG. 2B. As shown in FIG. 3C, the overhead console 180 including the console frame member 200 is releasably fastened to the front frame member 190 via a release assembly 270, which will be described in greater detail herein below. Additionally, FIG. 3C further shows one embodiment of a media enclosure 290 that is mounted in the second side frame section 216 so as to be positioned behind the console shell member 202. As shown, various media components 292 can be positioned and securely fastened within the media enclosure 290 so as to be accessible and viewable from the interior living space 112. It should be appreciated that similar media enclosures can be mounted within the main frame section 212 and the first side frame section 214 without departing from the scope of the present teachings.

Figure 3D:
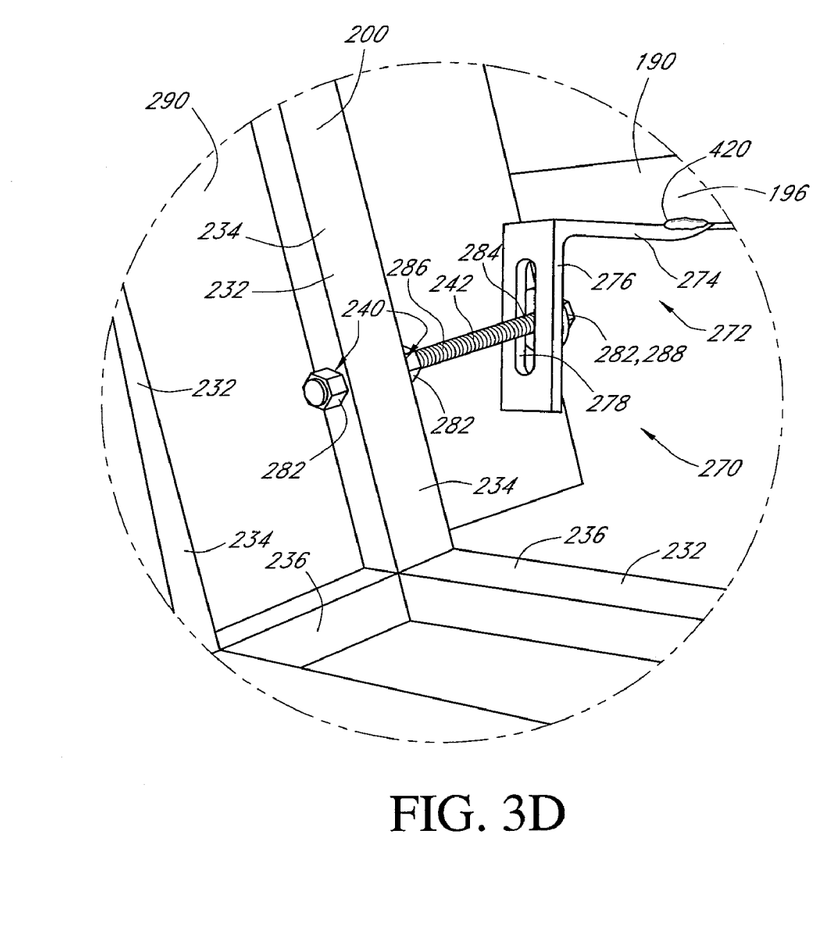
FIG. 3D shows one embodiment of a release assembly that fastens the overhead console to the front frame member.

FIG. 3D shows one embodiment of the release assembly 270 that releasably fastens the overhead console 180 including the console frame member 200 to the front frame member 190. In one embodiment, the release assembly 270 includes a bracket 272 having a first member 274 attached to a second member 276 so as to generally define an L-shaped structure. As shown in FIG. 3D, the first member 274 of the bracket 272 is securely attached to at least one of the structural members 196 of the front frame member 190 via a fastening means, such as a weld (depicted as 420). As further shown in FIG. 3D, the second member 276 of the bracket 272 defines a slotted region 278 that is adapted to receive the mounting post 242, such as a bolt, and one or more fastener components 282, such as nuts. In addition, the mounting post 242 is adapted to communicate with the slotted region 278 of the bracket 272 and with one or more mounting apertures 240 formed in at least one of the structural members 232 of the console frame member 200 in a generally known manner. Moreover, the mounting post 242 includes a threaded surface 284 that is adapted to receive one or more of the fastener components 282 so as to securely fasten the console frame member 200 to the front frame member 190.

It should be appreciated by those skilled in the art that the release assembly 270 may include various other components, such as washers, etc., without departing from the scope of the present teachings. It should also be appreciated by those skilled in the art that the orientation or positioning of the release assembly 270 including the bracket 272 and the mounting posts 242 with respect to the structural members 190, 192, 232, 234 of the front frame member 190 and the console frame member 200 may be altered without departing from the scope of the present teachings.

In one embodiment, a first end 286 of the mounting post 242 communicates with the slotted region 278 of the bracket 272 and is releasably attached to the bracket 272 via a first fastener 288. The first fastener 288 is readily detachable from the mounting post 242 so that the console frame member 200 of the overhead console 180 can be readily detached from the front frame member 190. Advantageously, detaching the first fastener 288 from the mounting post 242 releases the overhead console 180 from the front frame member 190 and subsequently allows the overhead console 180 including the console frame member 200 to freely pivot or rotate away from the front frame member 190 in a manner as previously described with reference to FIGS. 2A–2C.

The present teachings described and show one embodiment of an articulating overhead console 180 for a recreational vehicle 100 that is adapted to pivot, as shown in FIGS. 2B, 2C, so as to provide ready access to media and utility components positioned therein. Advantageously, the movement of the console frame member 200 allows a user ready access to the rear of the overhead console 180 and media components housed therein including connection wires that are positioned behind the overhead console 180. In addition, the pivot assembly 230 securely fastens the console frame member 200 to the front frame member 190 such that the console frame member 200 can pivot or rotate with respect to the front frame member 190. Moreover, a user can readily detach the first fastener 288 from the mounting post 242 so as to release the overhead console 180 from the front frame member 190 to thereby allow the overhead console 180 including the console frame member 200 to freely pivot or rotate away from the front frame member 190.

Figure 4A:
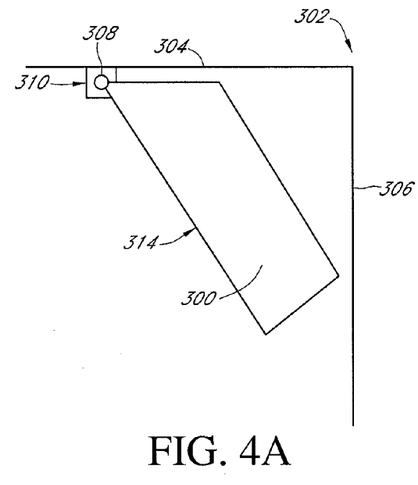
FIGS. 4A and 4B show how one embodiment of an overhead console can be pivotably mounted with respect to any corner defined by an upper portion of a wall and a ceiling.
Figure 4B:
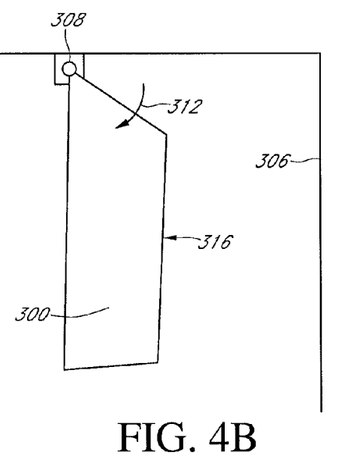
Figure 5:
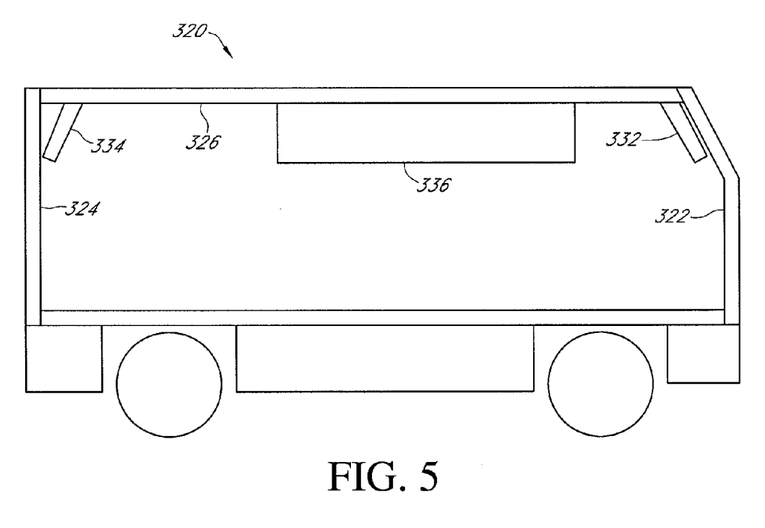
FIG. 5 shows that the pivotably mounted overhead console can be located at the front, rear, along the side, or any combination thereof.
Figure 6:
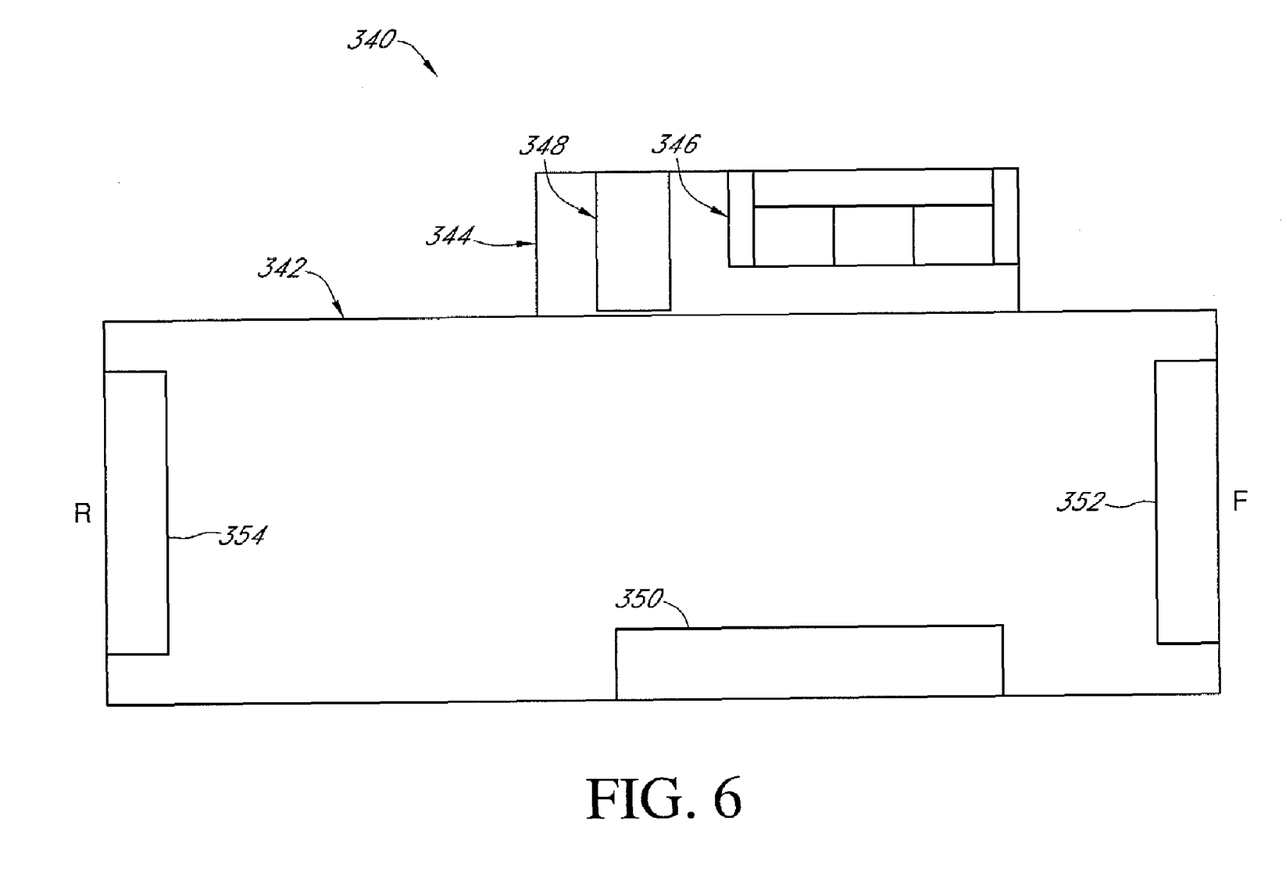
FIG. 6 shows that in one embodiment, the overhead console can be mounted at a selected location in the interior living space, such as along the side generally opposite from where a couch is located.

As described above in reference to FIGS. 1–3, one embodiment of the overhead console is located at the front portion of the interior living space. It will be understood, however, that one or more similar pivotably mounted overhead consoles can be mounted at other locations. FIGS. 4–6 now show by example various embodiments recreational vehicles having overhead consoles at various locations.

As shown in FIGS. 4A and 4B, one embodiment of a pivotably mounted console 300 can be pivotably mounted to a support structure, including a support member 310 that supports a pivot 308. Within the interior living space of a recreational vehicle, such a mounting can be achieved about any corner 302 defined by an upper portion of a wall 306 and a ceiling 304. As shown in FIG. 4A, the mounted console 300 in its "up" position orients its front face 314 so that components therein (not shown) face the user. As shown in FIG. 4B, the mounted console 300 can be rotated about the pivot 308 (as indicated by an arrow 312) to a "down" position, thereby providing an easier access to the console's rear portion 316. Various embodiments of such a console and support structures that allow such rotational movements have been described above in greater details in reference to FIGS. 1–3.

Mechanisms similar to that of the example front mounting can be adapted to allow mounting of pivotable consoles at other locations in the recreational vehicle. FIG. 5 now shows one embodiment of a recreational vehicle 320 having a front frame member 322, a rear frame member 324, and a side frame member 326 that form a support structure for the interior living space.

As described above in reference to FIGS. 1–3, a front console 332 can be mounted to a structure associated with the front frame member 322. Similarly, a rear console 334 can be mounted to a structure associated with the rear frame member 324. Similarly, a side console 336 can be mounted to a structure associated with the side frame member 326. It will be understood that in one embodiment of a recreational vehicle can have any combination of the front, rear, and side consoles 332, 334, 336. Furthermore, the dimensions of the front, rear, and side consoles 332, 334, 336 can be as long as the respective front, rear, and side walls, in either segmented or a substantially continuous form.

FIG. 6 now shows one embodiment of an example interior layout 340 having a side console 350 positioned as a selected location. The example interior layout 340 includes a couch 346 and a dining table 348, similar to that described above in reference to FIG. 1B. The couch 346 is shown to be part of an extended living space provided by a slideout 344 that extends from a side wall 342. In such a configuration, it may be desirable to position a pivotably mounted overhead console 350 at a location that is generally opposite from the couch 346 to allow occupants to enjoy the various components retained in the console 350. As shown in FIG. 6 and described above, the existence of the side console 350 does not preclude front and/or rear mounted consoles 352 and 354.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the present invention. Consequently, the scope of the invention should not be limited to the foregoing description, but should be defined by the appended claims.

What is claimed is:

1. A recreational vehicle comprising:
   a chassis having a plurality of wheels;
   a vehicle frame having a front frame member mounted to the chassis;

a coach having a plurality of walls that are joined together so as to define an interior living space with a floor and a roof, wherein the plurality of walls includes a front wall positioned adjacent the front frame member, and wherein the interior living space includes a first living area defined adjacent the front wall;

an overhead console pivotally attached to the front frame member, wherein the overhead console articulates from a first position relative to the front wall of the coach to a second position that is a first distance away from the front wall.

2. The recreational vehicle of claim 1, wherein the front frame member is mounted to a front end of the vehicle frame so as to extend therefrom in a substantially perpendicular manner.

3. The recreational vehicle of claim 1, wherein the overhead console is positioned adjacent the front wall and the coach roof so as to be accessible from the front portion of the interior living space.

4. The recreational vehicle of claim 1, wherein the articulation of the overhead console facilitates access to the rear of the overhead console.

5. The recreational vehicle of claim 1, wherein the overhead console comprises a plurality of structural members that are joined together so as to define a media enclosure having a main enclosure that houses at least one first media component and a plurality of side enclosures that houses at least one second media component.

6. The recreational vehicle of claim 5, wherein the overhead console is adaptively sized so as to house the first and second media components.

7. The recreational vehicle of claim 5, wherein the first and second media components are electrically connected via connection wires that are positioned behind the overhead console.

8. The recreational vehicle of claim 5, wherein the articulation of the overhead console facilitates access to the rear of the first and second media components including the connection wires that are positioned behind the overhead console.

9. The recreational vehicle of claim 5, wherein the at least one first media component is selected form the group consisting of a viewing monitor and a television, and wherein the at least one second media component is selected form the group consisting of a personal computer (PC), a digital satellite system (DSS) receiver, a digital video disk (DVD) player, a video cassette recorder (VCR) including a video cassette player, a compact disk (CD) player, a stereo receiver, an audio power amplifier, and an audio-video (AV) distribution device.

10. The recreational vehicle of claim 1, wherein the overhead console comprises a console frame member and a console shell member that is attached to a front portion of the console frame member.

11. The recreational vehicle of claim 10, wherein the console frame member of the overhead console is releasably fastened to the front frame member of the vehicle frame via a release assembly.

12. The recreational vehicle of claim 11, wherein the release assembly comprises at least one bracket having a first member attached to a second member in a substantially perpendicular manner so as to define an L-shaped structure.

13. The recreational vehicle of claim 12, wherein the first member is securely attached to the front frame member via a fastening means that includes a weld.

14. The recreational vehicle of claim 13, wherein the second member comprises a slotted region that is adapted to receive a shaft component, and wherein the shaft component is adapted to communicate with the slotted region of the bracket and with at least one mounting aperture formed in the console frame member, and wherein the shaft component comprises a threaded surface that is adapted to receive at least one fastener component so as to releasably fasten the console frame member to the front frame member.

15. The recreational vehicle of claim 14, wherein a first end of the shaft component communicates with the slotted region of the at least one bracket and is releasably attached to the at least one bracket via a first fastener, and wherein the first fastener is readily detachable from the shaft component so that the console frame member of the overhead console can be detached from the front frame member, and wherein detaching the first fastener releases the console frame member from the front frame member and allows the overhead console including the console frame member to freely pivot or rotate away from the front frame member.

16. The recreational vehicle of claim 15, wherein the shaft member comprises a bolt that is adapted to receive the first fastener, and wherein the first fastener comprises a nut that is adapted to communicate with the shaft member so as to be releasably fastened thereto.

17. The recreational vehicle of claim 10, wherein the console shell member comprises a contoured shape that is similar in appearance to the interior living space, and wherein the contoured shape of the console shell member is adapted to cover the console frame member.

18. The recreational vehicle of claim 17, wherein the console shell member comprises a rigid material including plastic.

19. The recreational vehicle of claim 10, wherein the console shell member comprises one or more openings formed therein that allow access to the interior of the overhead console.

20. The recreational vehicle of claim 10, wherein the console frame member comprises a rigid material including a metal or metal alloy material selected from the group consisting of steel and aluminum.

21. The recreational vehicle of claim 1, further comprising:
 a side frame member mounted to the chassis, and a side wall mounted to the side frame member; and
 a side overhead console pivotally attached to the side frame member, wherein the side overhead console articulates from a first position relative to the side wall to a second position that is a first distance away from the side wall.

22. The recreational vehicle of claim 1, further comprising:
 a rear frame member mounted to the chassis, and a rear wall mounted to the rear frame member; and
 a rear overhead console pivotally attached to the rear frame member, wherein the rear overhead console articulates from a first position relative to the rear wall to a second position that is a first distance away from the rear wall.

23. A recreational vehicle comprising:
 a chassis having a plurality of wheels;
 a vehicle frame mounted to the chassis;
 a coach supported at least in part by the vehicle frame, wherein the coach includes a plurality of walls that are joined together so as to define an interior living space with a floor and a roof;
 an overhead console pivotally coupled to a portion of the vehicle frame, wherein the overhead console is configured to retain and present one or more media components in the interior living space when in a first orientation, and wherein the overhead console articulates from the first orientation to a second orientation that provides an easier access to rear portions of the one or more media components.

24. The recreational vehicle of claim 23, wherein the first orientation provides easy viewing and controlling of the one or more media components.

25. The recreational vehicle of claim 24, wherein the second orientation provides easy servicing of the rear portions of the one or more media components.

26. The recreational vehicle of claim 25, wherein the easy servicing is allowed by providing an increased amount of separation between the rear portions of the one or more media components in the overhead console and a wall adjacent the overhead console.

27. The recreational vehicle of claim 23, wherein the plurality of walls includes a front wall, and the overhead console is coupled to a front frame member.

28. The recreational vehicle of claim 23, wherein the plurality of walls includes a rear wall, and the overhead console is coupled to a rear frame member.

29. The recreational vehicle of claim 23, wherein the plurality of walls includes a side wall, and the overhead console is coupled to a side frame member.

30. The recreational vehicle of claim 29, wherein the interior living space includes a living room having a couch that faces a first side wall, and wherein the overhead console is coupled to the side frame member corresponding to a second side wall that is opposite from the first side wall, thereby allowing the overhead console to be enjoyed from the couch.

* * * * *